United States Patent [19]

Iwata

[11] Patent Number: 5,053,102
[45] Date of Patent: Oct. 1, 1991

[54] BRAKE LINING BONDING APPARATUS

[75] Inventor: Yukio Iwata, Saitama, Japan

[73] Assignee: Akebono Brake Industry Co., Ltd., Tokyo, Japan

[21] Appl. No.: 587,638

[22] Filed: Sep. 25, 1990

Related U.S. Application Data

[63] Continuation of Ser. No. 254,020, Oct. 6, 1988, abandoned.

[30] Foreign Application Priority Data

| Nov. 5, 1987 [JP] | Japan | 62-168552[U] |
| Nov. 5, 1987 [JP] | Japan | 62-168553[U] |
| Nov. 5, 1987 [JP] | Japan | 62-168554[U] |
| Nov. 5, 1987 [JP] | Japan | 62-168555[U] |

[51] Int. Cl.$^5$ ............. B23P 15/18; F16D 69/04
[52] U.S. Cl. .................. 156/580; 100/93 PB; 156/581; 269/900; 269/909
[58] Field of Search ............. 156/580, 581, 583.3; 100/93 PB; 269/900, 909

[56] References Cited

U.S. PATENT DOCUMENTS

| 2,523,507 | 9/1950 | Langford et al. | 156/581 |
| 2,649,132 | 8/1953 | Barrett | 100/93 PB |
| 3,638,560 | 2/1972 | Morgan, Sr. et al. | 100/93 PB |
| 3,881,982 | 5/1975 | Morgan, Sr. et al. | 156/309 |
| 4,104,961 | 8/1978 | Morgan, Jr. | 100/93 PB |
| 4,252,599 | 2/1981 | Raffauf | 156/580 |

FOREIGN PATENT DOCUMENTS 53-134832 11/1978 Japan.

Primary Examiner—Michael Wityshyn
Attorney, Agent, or Firm—Finnegan, Henderson, Farabow, Garrett, and Dunner

[57] ABSTRACT

A brake bonding apparatus in which brake linings are positioned between a loop-like pressure-imposing band and a pair of brake shoes, which are disposed at opposite locations on the inner side of the band, and pressure-bonded to the brake shoes by expanding in opposite direction an expanding member which is urged by springs. The pressure-imposing band is provided with rigid strips at two circumferential locations for positioning itself in a predetermined position and is formed in substantially eliptic shape. The expanding member is arranged not to hold the rib in sandwich relation, but merely to abut the end portions thereof.

21 Claims, 8 Drawing Sheets

BRAKE LINING BONDING APPARATUS

This application is a continuation of application Ser. No. 07/254,020, filed Oct. 6, 1988, now abandoned.

BACKGROUND OF THE INVENTION

1. Field of the Invention

The present invention relates to a brake lining bonding apparatus which is used for bonding a lining onto a brake-shoe of a drum brake and relates to a registry mechanism for properly positioning brake-shoes and linings in the apparatus.

2. Description of the Prior Art

A conventional bonding apparatus of this type has been disclosed, as shown in FIG. 14, in Japanese Patent Laid-Open Application No. 134832/78 in which a pair of brake shoes 62 T-shaped in cross section are positioned at the inner side a loop-shaped pressure imposing band 61. Linings 63 applied with a bonding agent of a heat-hardening type on their surfaces are disposed between the brake-shoes 62 and the pressure imposing band 61. A pair of pronged members 65 on the left hand side of an expanding member 64 and another pair of pronged members 65 on the right hand side of the expanding member 64 are allowed to fit to a respective rib 66 of the brake shoes 62. The expanding member 64 is caused to expand in opposite directions by a plurality of springs 67 interposed between the left and right parts of the expanding member 64.

The brake shoes 62 are urged outwardly toward the linings 63, and the brake shoes 62 are bonded to the respective linings through heat treatment. The pressure imposing band 61 is formed of spring steel, both ends of which are welded to each other. This pressure imposing band 61 is substantially circular when it is in relaxed condition.

In the above conventional apparatus, the pressure imposing band 61 is first removed from the outer circumference of the brake shoes 62, then the brake shoes 62 are removed from the pronged portions 65, thus requiring complicated steps in order to operate the apparatus. Since the apparatus is so arranged that the pronged portions 65 of the expanding member 64 fit to the ribs 66 of the brake shoes 62, it is required, in setting up prior to bonding, to fit the ribs 66 to the pronged portions 65 and then to fit the pressure imposing band 61 to the linings 63 applied to the outer periphery of the brake shoes 62.

Furthermore, a disassembling operation after the bonding operation requires the complicated steps of removing the pressure imposing band 61 from the brake shoes 62 while compressing the springs 67, and then removing the respective brake shoes 62 from the pronged portions 65 of the ribs 66 by shaking the brake shoes left and right. Thus, the conventional apparatus requires many complicated steps and, therefore, bonding work may be very difficult to automate, leading to high manufacturing costs.

The above-mentioned conventional apparatus is arranged so that the end portions 62a, 62b of the inner circumference of the brake shoes 62 abut the end portions so the brake shoes 62 have some play in circumferential direction with respect to the expanding member 64 and, accordingly, simple loading of the brake shoes does not assure proper positioning of the brake shoes. Thus, there has been a drawback that the brake shoes 62 have to have their positions individually aligned by visual observation every time they are loaded.

Further, in the conventional apparatus, the pronged portions 65 of the expanding member 64 fit to the ribs 66 of the brake shoes 62. Simply compressing the springs 67 does not allow loading of the brake shoes 62 nor removing of the brake shoes 62 after bonding. In addition, the pressure imposing band 61 is also required to be removed every time, thereby increasing the operating steps to follow.

Furthermore, the aforementioned conventional apparatus has no mechanism for holding the longitudinal ends of the lining 63, thus simply installing the lining 63 does not assure its longitudinal, proper positioning. Thus, another drawback is that the positions of linings 63 have to be aligned by visual observation every time they are loaded.

SUMMARY OF THE INVENTION

An object of the present invention is to solve the problems described and to simplify and effectively reduce the number of steps to follow in bonding work thereby leading to an automated process.

Another object of the invention is to provide a bonding apparatus in which manual bonding work is eliminated, thus the bonding work can easily be automated.

In order to automate the bonding work, it is necessary to arrange that the respective steps of inserting linings into, and removing linings from, the bonding apparatus are simplified, and removing is carried out without difficulty after heating and bonding. Brake shoes may have a variety of radii R and widths W depending on their sizes, but for automated bonding work, the apparatus should be maintained at a fixed height regardless of size of the brake shoes. The present invention relates to the above requirements.

Still another object of the invention is to solve the aforementioned problems of the conventional apparatus by incorporating a registry mechanism for properly positioning brake shoes so that no particular alignment operation is required in bonding operation.

In a brake lining bonding apparatus according to the present invention, brake linings 19 are positioned between a loop-like pressure imposing band 4 and a pair of brake shoes 11, which are disposed at opposite locations on the inner side of the band 4. The brake linings 19 are pressure-bonded to the brake shoes 11 by expanding, in opposite directions, an expanding member 2 which is urged by springs 3. The pressure imposing band 4 is provided with rigid strips 16 at two circumferential locations for positioning itself at a predetermined position, thus being formed into a substantially eliptic shape. The expanding member 2 is arranged not to hold the ribs 12 in a sandwich relation but to merely abut the end portions of the brake shoes 11.

A heat-hardening bonding agent is applied to an outer surface of linings 19 and the linings can be inserted laterally into the clearance between the pressure imposing band 4 and the left end of the expanding member 2 as well as into the clearance between the pressure imposing band 4 and the right end of the expand member 2. The springs 3 are set free from their compressed condition to cause the expanding member 2 to urge the end portions 12a, 12b of the brake shoes 11 outwardly and, accordingly, the linings 19 are bonded through the pressure applied.

After bonding a heating operation, the left and right ends of the expanding member 2 are disengaged from the end portions 12a, 12b of the brake shoes 11 while the springs 3 are compressed. Since the pressure imposing band 4 remains eliptic at the same location on a strain apparatus, which will be described later, with the aid of the rigid strip 16, the brake shoes 11 may be lifted out easily from the pressure imposing band 4 and the expanding member 2.

Inserting both the brake shoes 11 and linings 19 prior to the bonding operation and removing the brake shoes 11 after the bonding operation, require a simple procedure in which the brake shoes are transferred laterally with respect to the pressure imposing band 4 in a single step, thus making automated bonding work possible.

Further, in a brake lining bonding apparatus according to another aspect of the present invention, the brake linings 19 positioned between a loop-like pressure imposing band 4 and a pair of brake shoes 11 disposed on opposite locations at the inner side of the band 4 are pressure-bonded to the brake shoes 11 by expanding, in opposite directions, the expanding member 2 urged by springs 3. The expanding member 2 is formed of left and right base plates 6 which are central members that receive an elastic force of the springs 3. Shoe receiving members 8 are provided at one end of both of the respective base plates 6 and shoe positioning members 9 are provided at the other end of both base plates. Skates 10 are provided on the base plates to support the bonding apparatus at a required height.

When the brake shoes are loaded into the bonding apparatus, they are positioned in a predetermined position by means of the shoe positioning members 9 and the shoes receiving members 8 which are provided on the left and right base plates 6 of the expanding member 2.

Since bonding apparatus 1 is supported by the skates 10 provided on the left and right plates 6, the insertion of the brake shoes 11 and the linings 19 before bonding operation, the removal of the brake shoes and the linings 19 after bonding operation, and the transfer operation in the finishing process, subsequent to heating and bonding, can be carried out smoothly.

Furthermore, in a brake lining bonding apparatus according to still another aspect of the present invention, brake linings 19 are positioned between a loop-like pressure imposing band 4 and a pair of brake shoes 11 disposed on opposite locations at the inner side of the band 4 and pressure-bonded to the brake shoes 11 by expanding in opposite directions the expanding member 2 which is urged outwardly by springs 3. The expanding member 2 is formed of a left base plate 6 and a right base plate 6 which are central members to receive spring force of the springs 3, shoe receiving members 8 provided at one end of both of the respective base plates 6, and shoe positioning members 9 provided at the other end of both base plates. The shoe receiving members 8 are caused to abut against one circumferential end 12a of the rib 12 of a brake shoe 11, and the shoes positioning members 9 are shaped to fit to the other circumferential end 12b of the rib 12 thereby positioning the brake shoes 11 in circumferential direction of the pressure imposing band 4.

Since each of the shoe receiving members 8 are caused to abut against one circumferential end 12a of the rib 12 of the brake shoes 11, the shoe positioning members 9 are shaped to fit to the other circumferential end 12b of the rib 12, and the brake shoes 11 are prevented from being misaligned in circumferential direction with the aid of the shoe receiving members 8 and the shoe positioning members 9. Thus when the brake shoes 11 are loaded in the bonding apparatus 1, no alignment is required to properly position the brake shoes in a predetermined position.

Further, in a brake lining bonding apparatus according to the present invention, brake linings 19 are positioned between a loop-like pressure imposing band 4 and a pair of brake shoes 11, which are disposed at opposite locations on the inner side of the band 4. The brake linings 19 are pressure-bonded to the brake shoes 11 by expanding in opposite directions the expanding member 2, which is urged outwardly by springs 3. In the apparatus, circumferential positioning of the linings 19 is carried out by front and rear mounting seats 37 and 38 which are adapted to approach the bonding apparatus 1 by a predetermined distance, and lining positioning members 35 and 36 mounted on the mounting seats 37 and 38. Each end of the lining positioning members 35 and 36 is arranged to abut against the circumferential ends 19a, 19b of the linings 19 through elongated holes 17, 18 formed in the pressure imposing band 4.

When the front and rear mounting seats 37 and 38, which are provided with the lining positioning members 35 and 36, that approach the bonding apparatus 1 to a predetermined distance, the end portions 35a and 36a of the lining positioning members 35 and 36 abut against the circumferential ends 19a and 19b of the linings 19 through the elongated holes 17 and 18 of the pressure imposing band 4, respectively, thereby eliminating misalignment of the linings 19 in a circumferential direction. Thus, when the brake shoes 11 are loaded into the bonding apparatus 1, no alignment operation is required to properly position the linings 19 in a predetermined position and, accordingly, the operation is simplified to implement automated an bonding operation.

BRIEF DESCRIPTION OF THE DRAWINGS

FIG. 1 is a top view of a bonding apparatus;
FIG. 2 is a front view of FIG. 1;
FIG. 3 is a top view of a bonding apparatus which has been set in a strain apparatus;
FIG. 4 is a front view of FIG. 3;
FIG. 5 is a top view of a pressure imposing band;
FIG. 6 is a front view of FIG. 5;
FIG. 7 is a transverse cross sectional view of the essential portion of FIG. 3;
FIG. 8 is a longitudinal cross sectional view of the essential portion of FIG. 7;
FIG. 9 is a top schematic view of an automated bonding operation line;
FIG. 10 and FIG. 12 a bottom view of lining positioning member;
FIG. 11 is a side view of FIG. 10;
FIG. 13 is a side view of FIG. 12.

PREFERRED EMBODIMENTS OF THE INVENTION

An embodiment of the invention will now be described with reference to the accompanying drawings.

Figure 1:
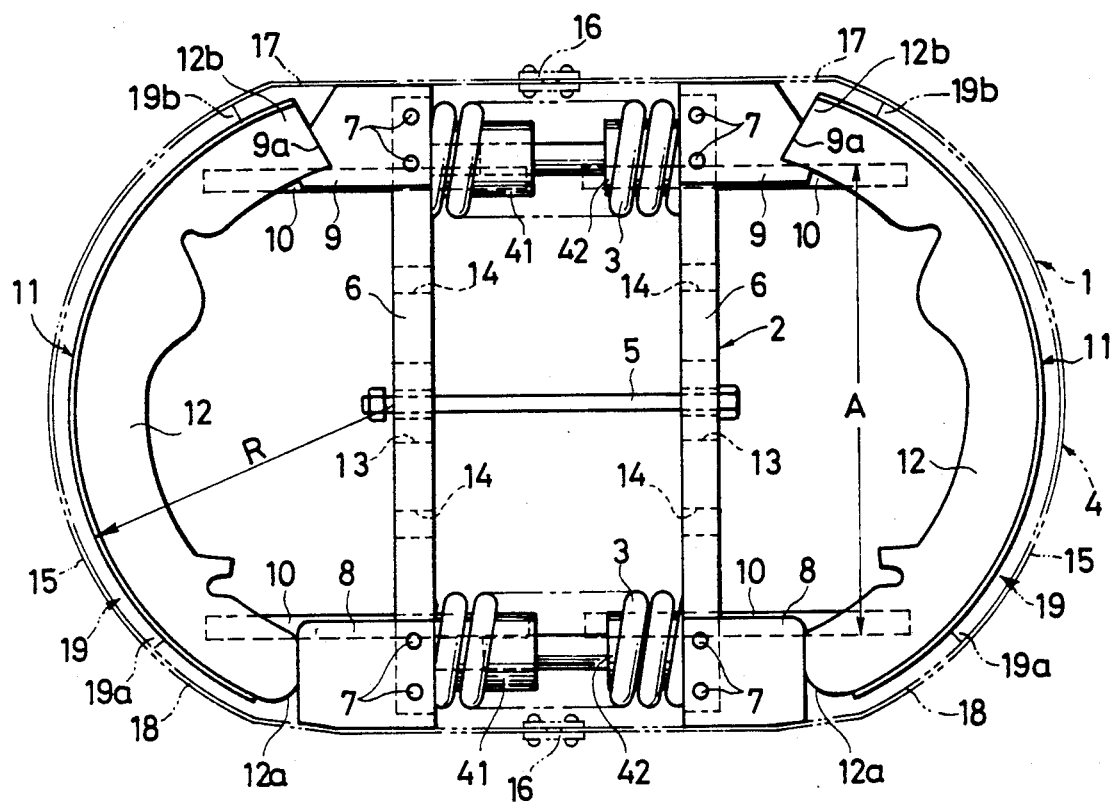
FIG. 1 to FIG. 13 show an embodiment of the present invention.
Figure 2:
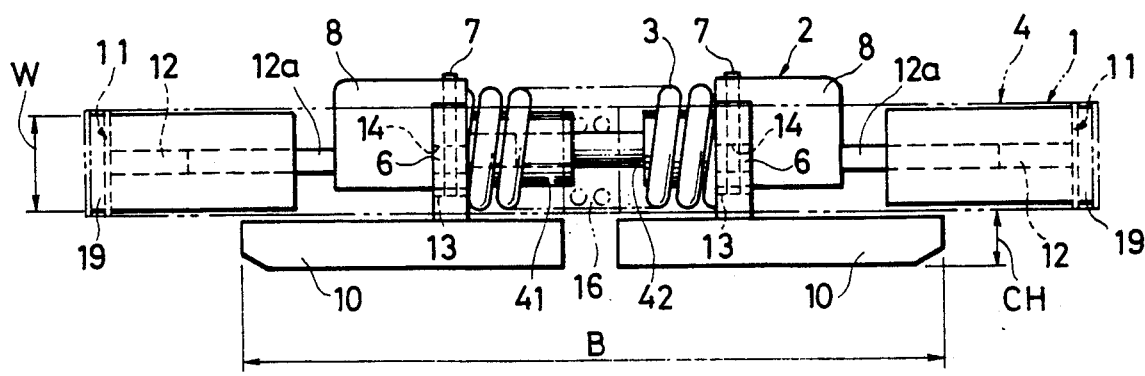

FIG. 1 shows a top view of a bonding apparatus 1 and FIG. 2 shows a front view thereof. The bonding apparatus disclosed herein is formed of springs 3 for expanding an expanding member 2 in opposite directions a pressure imposing band 4 surrounding the expanding member 2, and a safety pin 5 for preventing excess expansion of the expanding member 2.

The expanding member 2 comprises left and right base plates 6, shoe receiving members 8 and shoe positioning member 9 each detachably mounted on one end of the respective base plates 6 by means of a plurality of pins 7 and skates 10 provided under the respective base plates 6 for sliding the bonding apparatus 1. Each shoe receiving member 8 is formed to abut one circumferential end 12a of a rib 12 of a brake shoe 11, and each shoe positioning member 9 is provided with a cut-out 9a of a shape corresponding to the other circumferential end 12b of the rib 12 so that the cut-out 9a fits to the end 12b.

Thus when the brake shoes 11 and linings 19 are inserted into the clearance between the expanding member 2 and the pressure imposing band 4, one of circumferential ends 12a of the brake shoe 11 abuts the end of the shoe receiving member 8 and the other circumferential end 12b of the brake shoe 11 fits to the cut-out 9a of the shoe positioning member 9, thereby preventing misalignment of the brake shoe 11 in circumferential direction to properly position with respect to the bonding apparatus 1.

Different sizes and shapes of the brake shoes 11 can easily be accommodated by removing the pins 7 from the base plates 6 and then replacing both the shoe receiving members 8 and the shoe positioning member 9 with appropriately sized ones. The aforementioned base plate 6 is provided with a recessed groove 13 engaging with a registry device for the bonding apparatus mounted on a strain apparatus, which will be discussed later. Pin-inserting holes 14 for suspending the bonding apparatus 1 is provided on the base plate 6.

Figure 5:
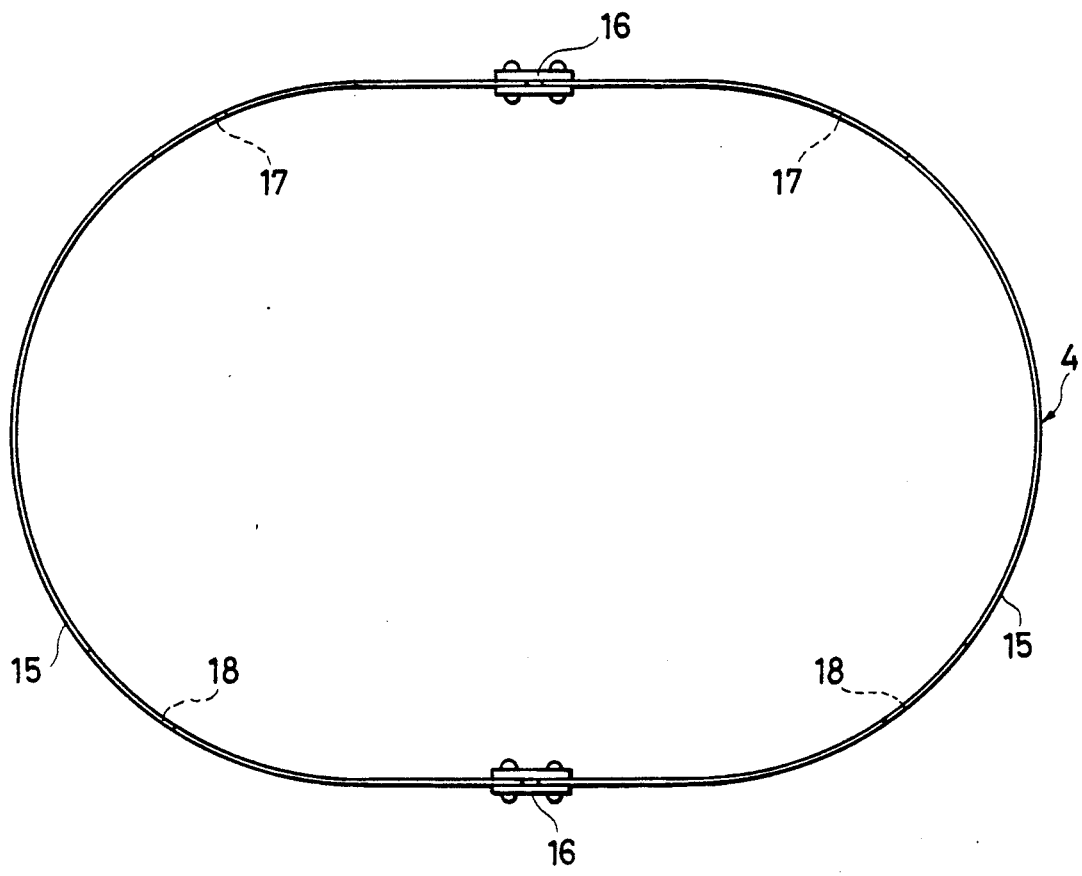
Figure 6:
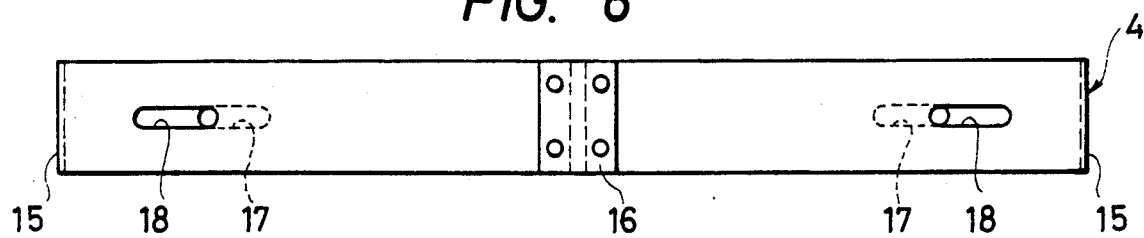

The pressure imposing band 4, its top view shown in FIG. 5 and its front view in FIG. 6, comprises two belts 15 for example of spring steel having equal lengths and connected by means of rivetting rigid strips 16 of steel. Both ends of one belt abut both ends of the other belt, and the pressure imposing band 4 is substantially eliptic when it is not strained. Further, the belts 15 of the pressure imposing band 4 are provided with elongated holes 17 and 18 near the rigid strips 16 for inserting a lining positioning member, which will be described later. The rigid strips 16 also provide means for aligning the bonding apparatus in a lateral direction when the bonding apparatus 1 is set to the strain apparatus, which will be described later. The linings 19 as shown in FIGS. 1 and 2 are supplied with a heathardening bonding agent on their surfaces in order to be bonded to the brake shoes.

Figure 3:
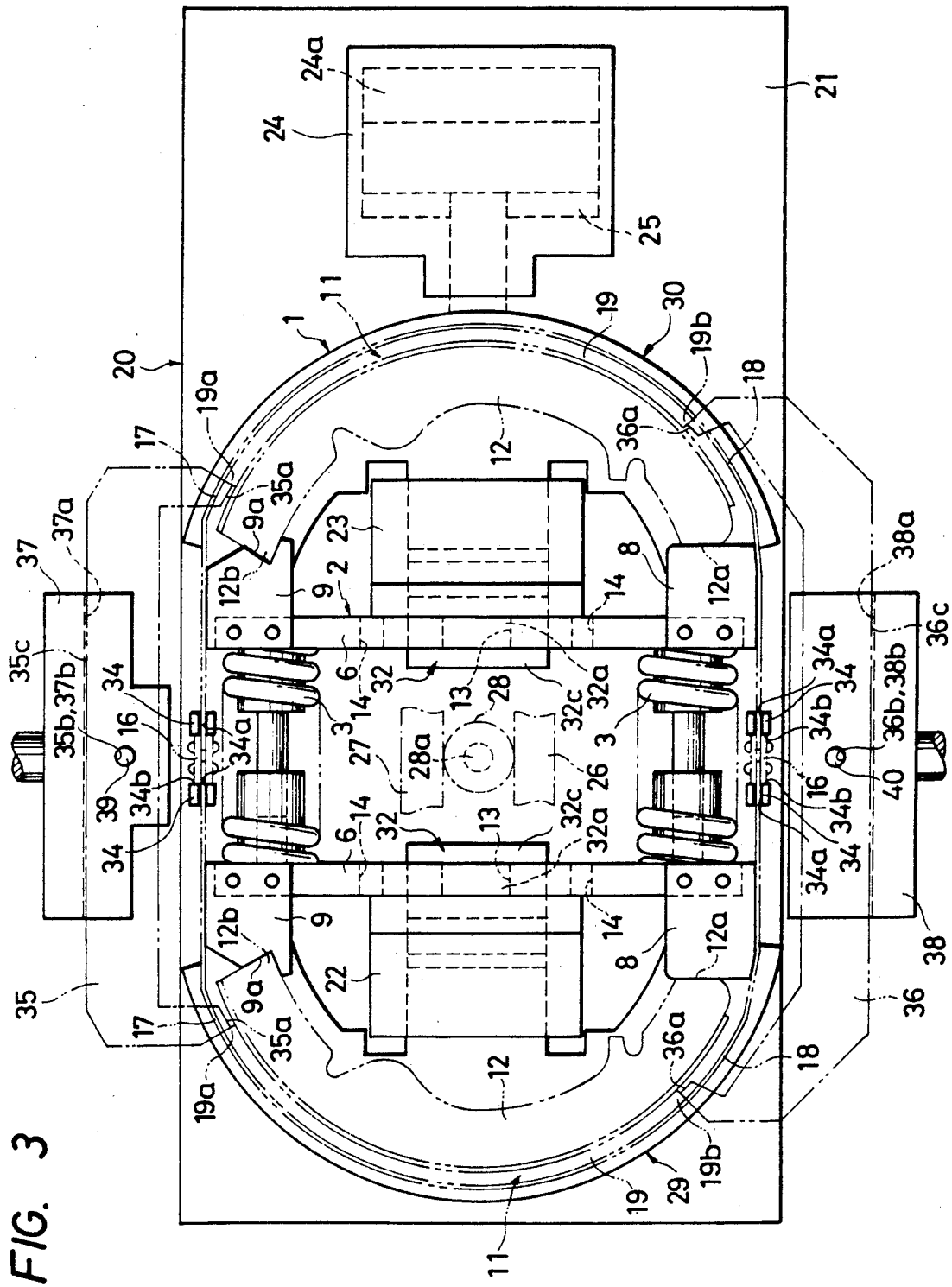
Figure 4:
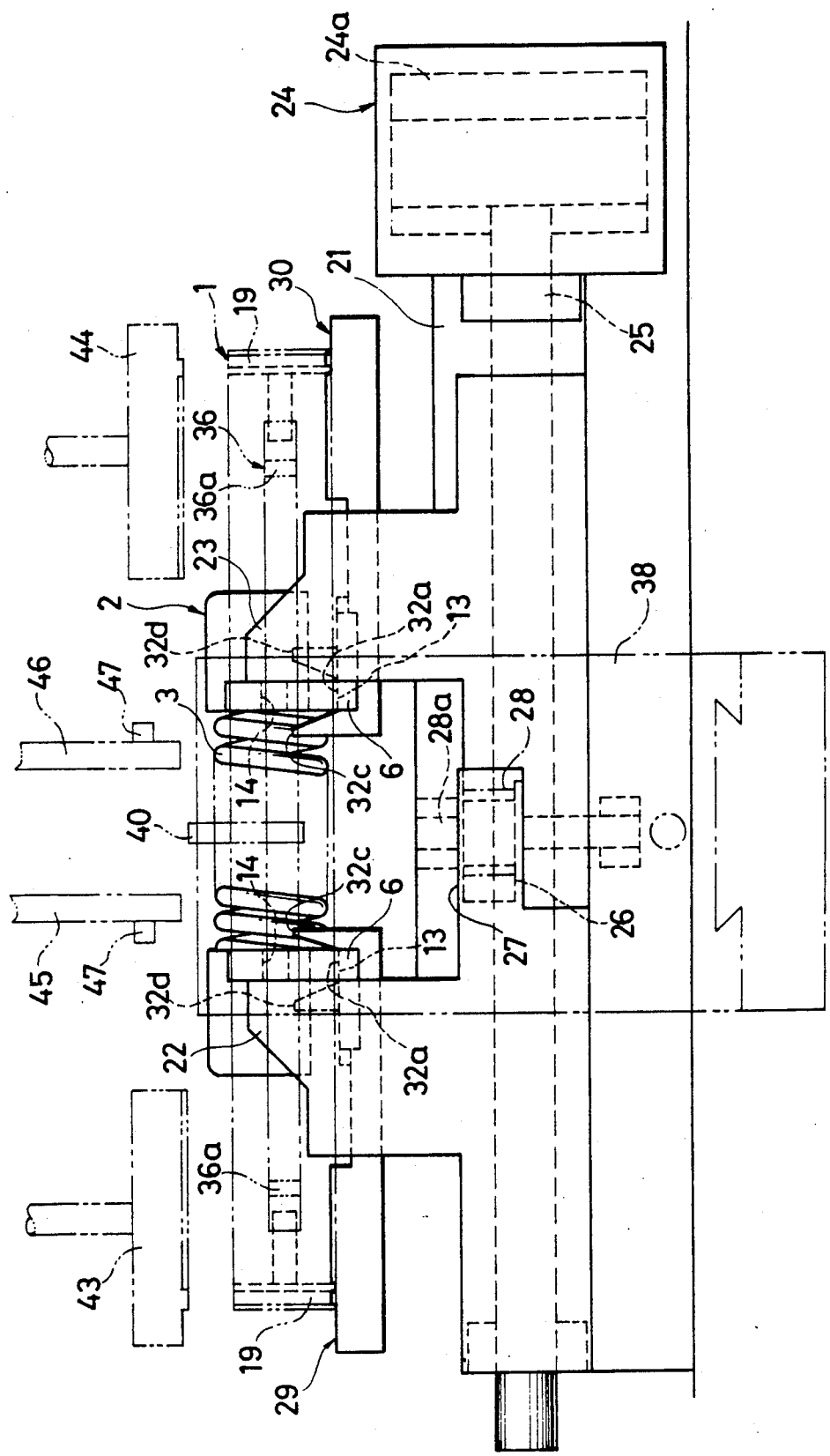
Figure 7:
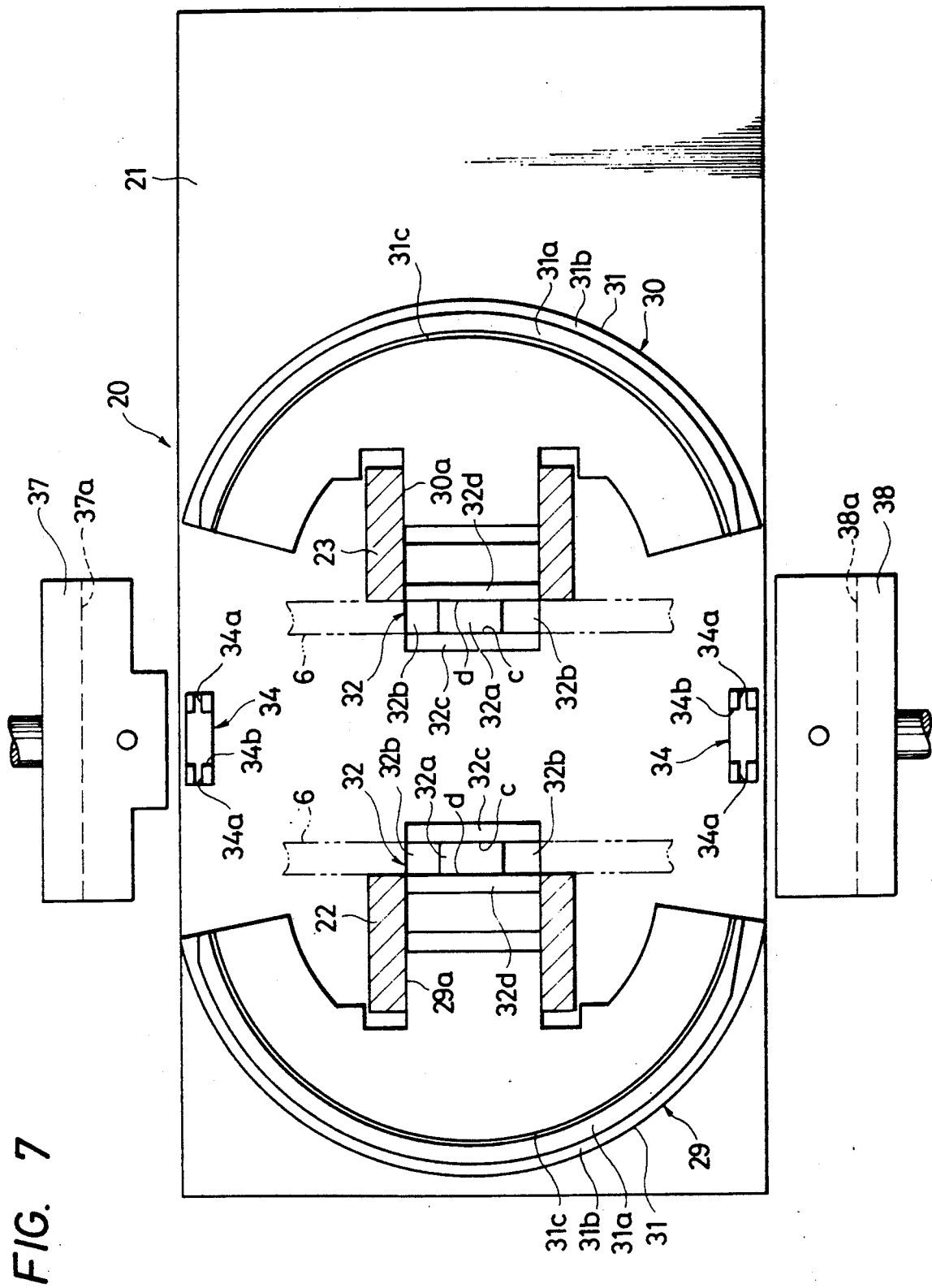
Figure 8:
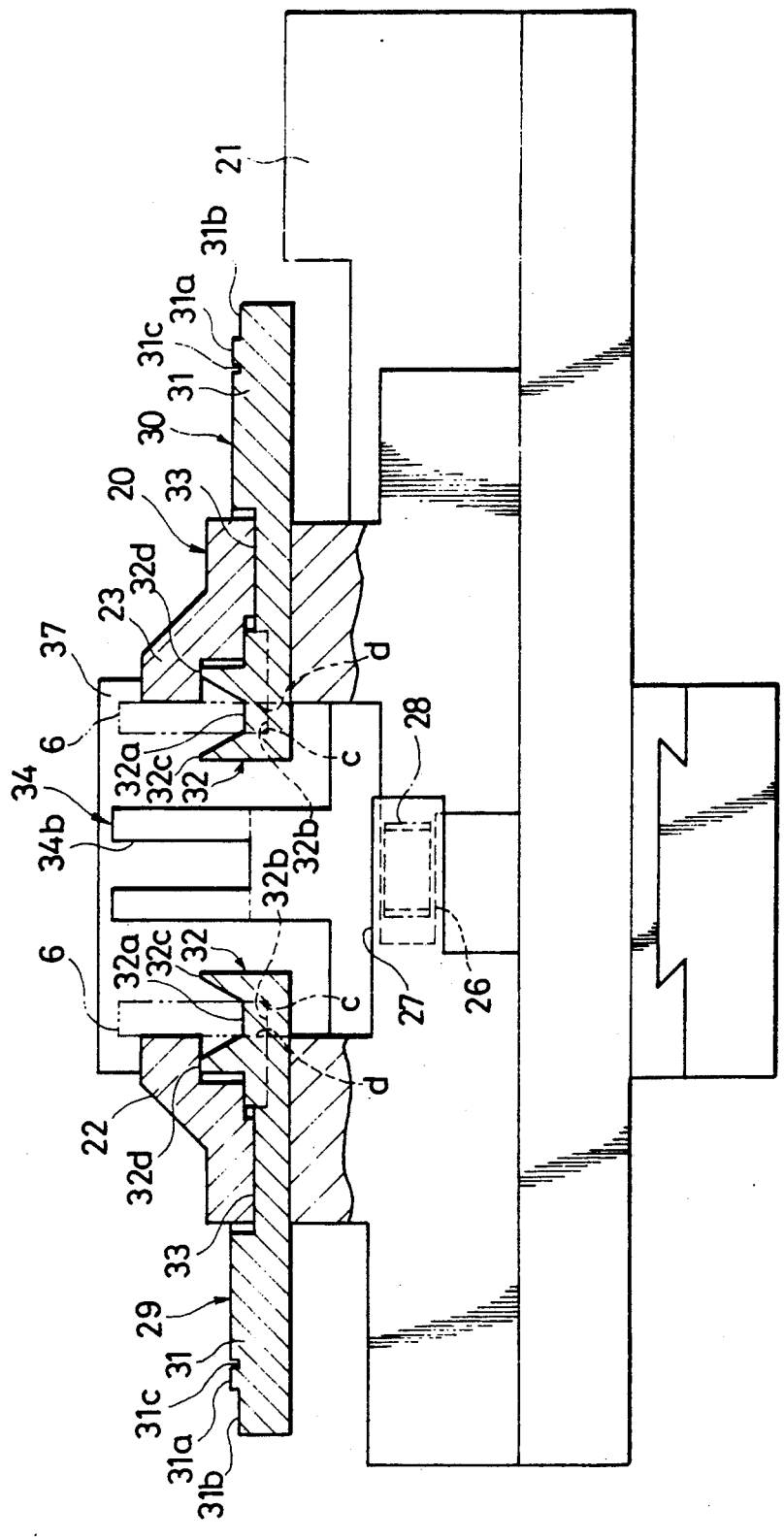

A strain apparatus 20 as shown in FIG. 3 will now be described. The apparatus 20 is used for insertion and positional alignment of the linings 19 and the brake shoes 11 in the bonding apparatus 1, and for the compression of the springs 3 required to remove the brake shoes 11 after bonding. FIG. 3 shows a top view of the strain apparatus 20. FIG. 4 shows a front view thereof; FIG. 7 shows a top view of the essential position that is cut out; and FIG. 8 shows a front view of the essential portion.

Left and right press heads 22 and 23 are mounted on a base 21 and slide to left and right along the longitudinal direction of the base 21. A rack 26 mounted to a press head 23 is provided on a piston 25 of a cylinder 24 secured to the base 21. A rack 27 mounted on a press head 22 and the rack 26 engage with a pinion 28, opposing to each other with respect to the pinion. The pinion 28 is journaled by a shaft 28a on the base 21. Tables 29 and 30 fit to the left and right of press heads 22 and 23, respectively, a means of guide grooves 29a and 30a (see FIG. 7). The tables 29 and 30 are provided with arcuate receiving seats 31, bonding apparatus positioning members 32, and a slide portions 33. The receiving seats 31 have first planes 31a which contact with the lower surfaces of the linings 19 when the bonding apparatus 1 is set properly on the apparatus 20. The seats 31 also have second planes 31b which are formed by cutting out the first planes 31a and contact with the lower surface of the pressure imposing band 4, and longitudinal recessed grooves 31c contacting with the lower surfaces of the brake shoes 11, as shown in FIG. 8. The bonding apparatus positioning members 32 are formed of protrusions 32a which fit to grooves 13 of the base plates 6, receiving portions 32b contacting with the lower surface of the base plates 6, and wedge-shaped guides 32c and 32d which guide the base plates 6 as they are inserted into the bonding-apparatus positioning member 32. A distance between c and d of the base portions of the guides 32c and 32d is defined substantially equal to the thickness of the base plate 6, thereby allowing easy positioning of the base plates 6 at a predetermined position. When a base plate 6 has been set, it is sandwiched by a base portion c of the guide 32c and the end surface of the press heads 22 and 23 thereby positioning the bonding apparatus properly on the strain apparatus 20 (See FIG. 8).

At the longitudinal center of the base 21, there are provided, at both widthwise ends of the base 21, grooves 34a into which the belt 15 can be fitted, and band positioning members 34 having registry grooves 34b into which the rigid strips 16 are allowed to fit without chattering.

The lining positioning members 35 and 36 for aligning circumferential position of the linings 19 with respect to the bonding apparatus 1 are mounted on mounting seats 37 and 38 which are adapted to move back and forth by means of a cylinder and a piston, which are not shown. The lining positioning members 35 and 36, a bottom view shown in FIG. 3 and a side view in FIG. 4, are provided with end portions 35a and 36a, and outer end surfaces 35d and 36d of the end portions 35a and 36a which are adapted to abut both the circumferential ends 19a and 19b, respectively, of the linings 19 when both ends of the lining position members 35 and 36 are inserted through the elongated holes 17 and 18 of the pressure imposing band 4.

The lining positioning members 35 and 36 are also provided with securing portions 35c and 36c and have holes 35b and 36b, respectively, for centrally locating the mounting pins.

The mounting seats 37 and 38 are provided with pronged fitting portions 37a and 38a into which respective securing portions 35c and 36c of the lining positioning member 35 and 36 are to fit, and pin-inserting holes 37b and 38b and which are aligned with pin-inserted holes 35b and 36b of said lining positioning members 35 and 36.

Fitting the securing portions 35c and 36c and then inserting detachable mounting pins 39 and 40 into pin-inserting holes 35b, 37b, 36b and 38b, permits secure mounting of lining positioning members 35 and 36 to the mounting seats 37 and 38 without loose fitting.

Figure 11:
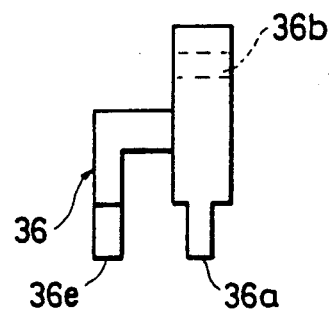
Figure 12:
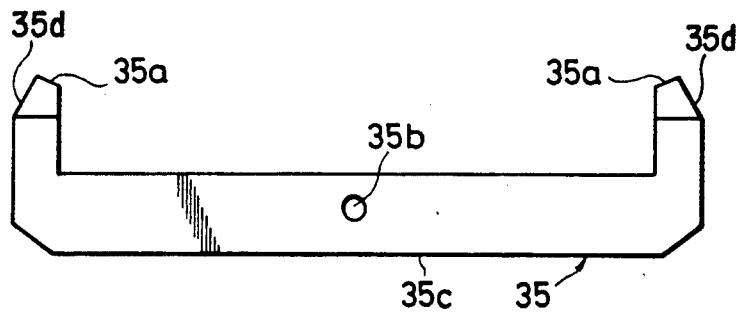
Figure 13:
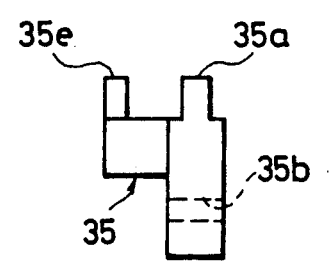
Figure 14:
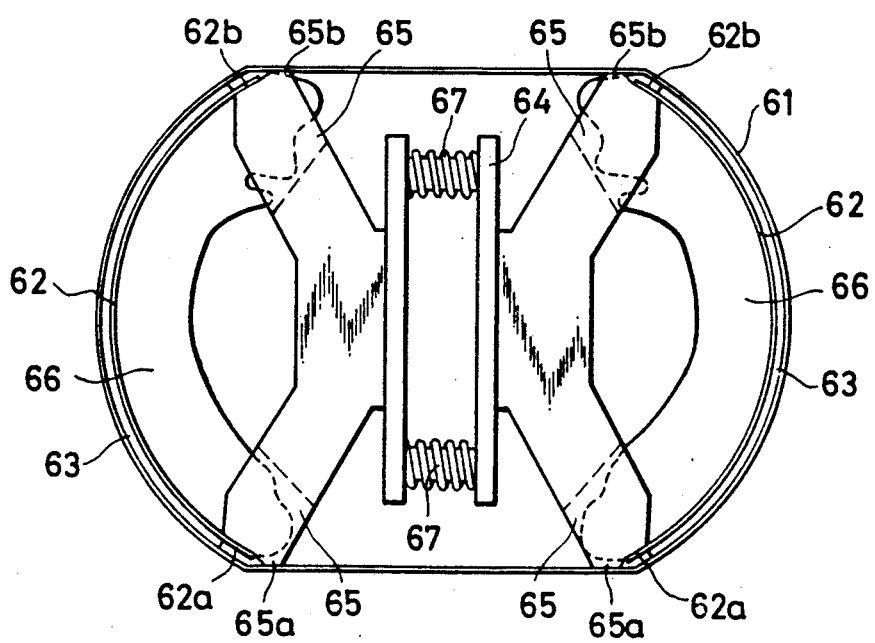
FIG. 14 is a top view of a prior art bonding apparatus.

Indicators 35e and 36e, shown in FIGS. 11 and 12, are provided on the lining positioning members 35 and 36, respectively, and are formed in the same shape as the end portions 35a, 36a as seen from top, and serve to indicate the location of the end portions 35a and 36a which are difficult to visually observe when aligning position of the linings.

Spring guide pins 41 and 42 mounted on the left and right plates 6 serve as a guide when one base plate 6 moves toward or away from the other. The bonding apparatus 1 is secured to tables 29 and 30 when the linings 19, the pressure imposing band 4, and the brake shoes 11 are pushed down by a left pressure imposing member 43 and a right pressure imposing member 44 which are driven vertically by a solenoid (not shown) of a pressure imposing device.

Referring to FIG. 1, the skates 10 are disposed in parallel to each other and separated by a fixed distance A, and positioned below the pressure imposing band 4 with a constant height CH. Two adjacent skates are spaced by a constant distance B. Thus, the bonding apparatus 1 is supported at a constant position regardless of a variety of sizes of the brake shoes 11.

Since the height CH of the skate 10 remains the same even if the width W of the brake shoes 11 changes, during transfer operation, for example, the bonding apparatus 1 is pushed reliably by a pusher from one conveyor to another (not shown) and smooth skating is ensured with the aid of skates 10.

Figure 9:
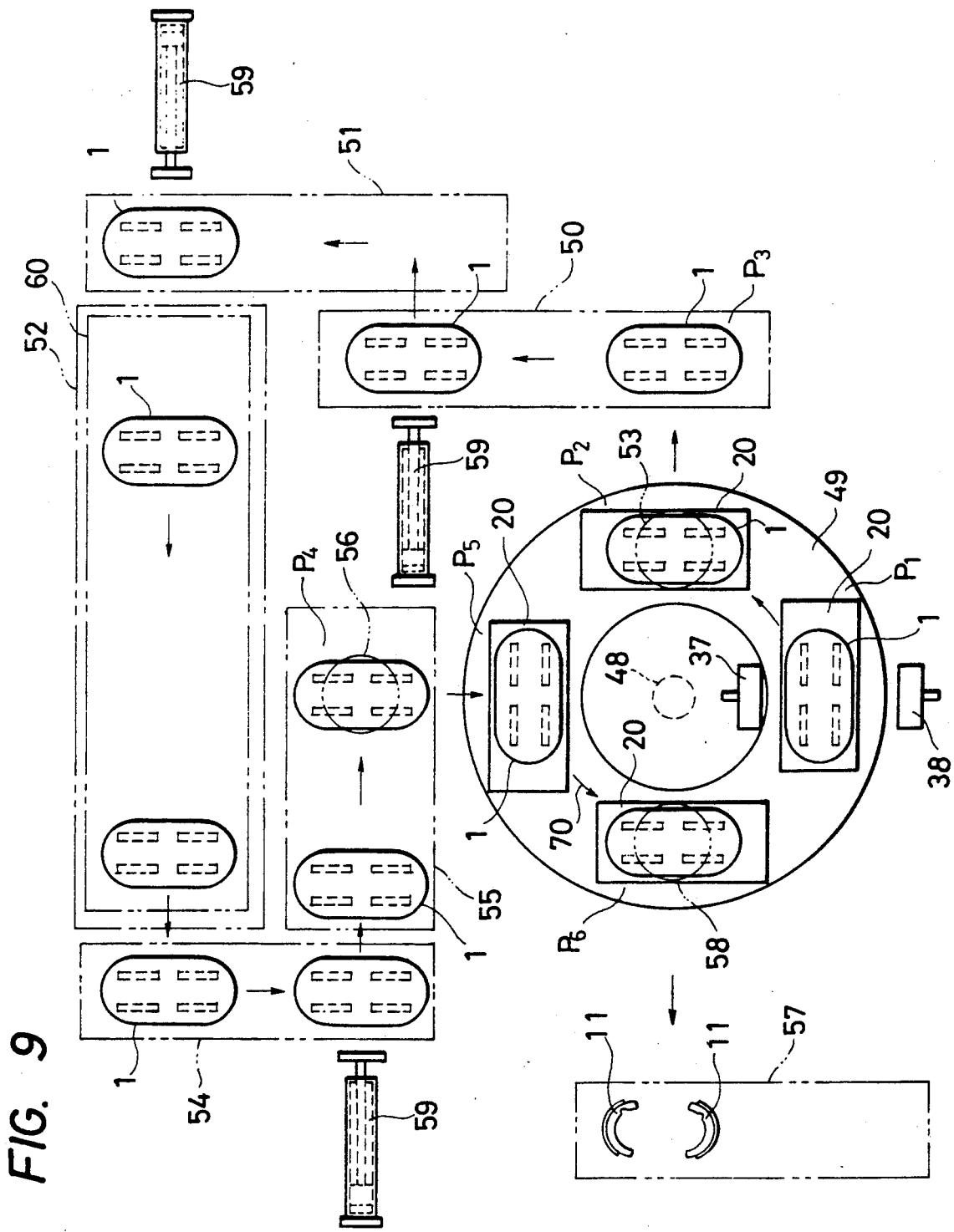
Figure 10:
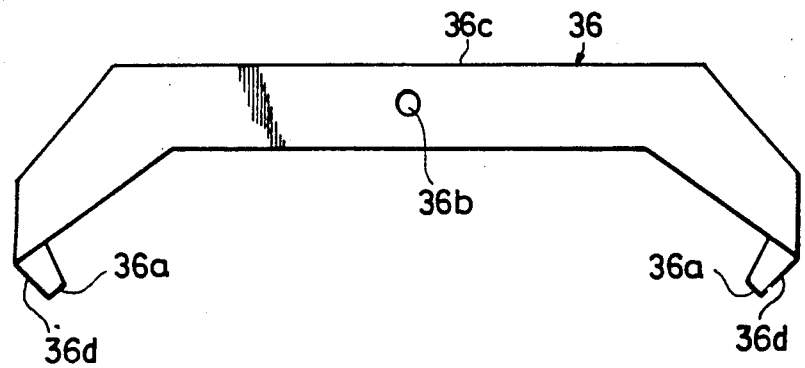

FIG. 9 shows a top view of an example of the layout for the automated bonding operation. Four strain apparatuses 20 are disposed on a turntable 49 which rotates intermittently about a rotational axis in the direction of an arrow 70. Conveyors 50 and 51 are provided adjacent a pressure intake position $P_2$, to which the turntable is rotated by 90 degrees relative to a lining inserting position $P_1$. A heater 52 of tunnel type is provided at the terminal end of the conveyor 51.

Additionally there is provided a pressure imposing device 53 which moves in a reciprocating manner between the pressure intake station $P_2$ and a beginning end $P_3$ of the conveyor 50, and this pressure imposing device 53 is provided with pressure imposing members 43 and 44 and hooks 45 and 46 which are capable of opening to left and right and capable of vertical movement. The hooks 45 and 46 are provided with a plurality of pins 47, which can fit into a plurality of pin inserting holes 14 of the base plates 6.

Conveyors 54 and 55 are provided at the exit of the heater 52. A lifter 56 is provided so that it moves in a reciprocating manner between the terminal end $P_4$ of the conveyors 55 and a receiving station $P_5$ on the turntable 49. The lifter 56 has hooks having a function similar to the above-mentioned hooks 45 and 46. The hooks of the lifter 56 are formed to rotate 90 degrees relative to a vertical line in a reciprocating manner.

An unloader 58 having a magnetic chuck is arranged so that it reciprocates between a conveyor 57 and an unloading station $P_6$ on the turntable 49, which is located 90 degrees from the receiving station $P_5$ about a rotational axis 48. Push cylinders 59 are employed for laterally transferring the bonding apparatus 1 between, for example, the conveyors 50 and 51.

The following is a bonding procedure according to the present invention. The bonding apparatus 1 placed on the tables 29 and 30 is adjusted back and forth along the of width the base 21 to be in registration with the recessed groove 13 of left and right plates 6 by fitting to protrusions 32a of the positioning member 32. The vertical position of the bonding apparatus 1 is adjusted to register with the lower surface of the base plate 6 by contacting the receiving portion 32b. The lateral position (longitudinal direction of the base 21) of the bonding apparatus 1 is aligned to register with the left and right base plates 6 by being sandwiched between the inner base c of the guide 32c and the end surfaces of the press heads 22 and 23.

The position of the pressure imposing band 4 is adjusted back and forth or laterally, and vertically, with the rigid strips 16 fitting into the registry grooves 34b of the band positioning member 34 and with the belts 15 fitting into the grooves 34a. In this manner, the bonding apparatus 1 is properly positioned in a predetermined position on the tables 29 and 30 of the strain apparatus 20.

Then fluid is introduced into a chamber 24a of the cylinder 24 to cause a piston 25 to advance; moving the right side rack 26 to the left; then the pinion engaging with rack 26 rotates clockwise to cause the left side rack 27 to move to the right; and the base plates 6 are pulled, left ones toward right ones, together with the left and right press heads 22 and 23, to thereby compress the springs 3.

A pair of brake shoes 11 and a pair of linings 19 are inserted into the shoe receiving members 8, shoe positioning members 9, and the pressure imposing band 4. The mounting seats 37 and 38, on which the lining positioning members 35 and 36 are mounted, are moved by the piston toward the center of the tables 29 and 30, thus the end portions 35a and 36a, which pass through the elongated holes 17 and 18 of the belts 15 abut the circumferential ends 19a and 19b of the linings 19, thereby adjusting the positions of the linings 19 back and forth and also laterally with respect to the pressure imposing band 4.

When the linings 19 are in registration, the piston retracts and the shoe positioning members 35 and 36 move out of engagement with the pressure imposing band 4 and the turntable 49 rotates 90 degrees in the direction of the arrow 70. The pressure imposing members 43 and 44 of the pressure imposing device 53 descend toward the bonding apparatus 1, and the linings 19, pressure imposing band 4, and brake shoes 11 are sandwiched vertically by the pressure imposing members 43 and 44 and the tables 29 and 30.

In this condition, ejecting fluid pressure from the chamber 24a of the cylinder 24 permits rightward movement of the right press head 23, the racks 26, and the piston 25 with the aid of repulsive force of the springs 3. The pinion 28 rotates counterclockwise and the left side rack 27 and the left press head 22 move leftwardly the same distance as the aforementioned rightward movement of the right press head 23. In connection with these leftward and rightward movements, the shoe receiving member 8 abuts strongly against one end 12a of the brake shoe 11, and the cut-out 9a of the shoe positioning member 9 abuts strongly against the other end 12b while at the same time the brake shoe 11 fits tightly to the lining 19 at a proper position. After initial set up, the pressure imposing members 43 and 44 move upwardly, and the left and right hooks 45 and 46 of the pressure imposing device 53 move downwardly. Next, the hooks 45 and 46 open to insert a pair of pins 47 provided on the hooks 45 and 46 into pin holes 14 of the base plates 6, and the bonding apparatus 1 lifts up from the strain apparatus 20 by moving the hooks 45 and 46 upwardly. Then the bonding apparatus is transferred to the conveyor 50 by moving the pressure imposing device 53. The skates 10 support the bonding apparatus 1 in a stable condition as the bonding apparatus is conveyed by the conveyor 50. The bonding apparatus 1 is transferred to the next conveyor 51 at the terminal end of the conveyor 50 by means of a pusher 59. This transfer operation is carried out smoothly and without any resistance, with the aid of skating action of the skates 10.

Since the height of the skates 10 is arranged to be constant for a variety of sizes of the brake shoes, the pusher 59 can push the bonding apparatus 1 every time at a preferred position.

The bonding apparatus 1 is transferred from the conveyor 51 to a conveyor 60 of the heater 52 by means of the pusher 59 and the bonding agent is applied to the surfaces of the linings 19 and hardens under heating after a predetermined amount of time, completing the bonding between the brake shoes 11 and the linings 19.

The bonding apparatus which leaves the heater 52 is carried by conveyors 54 and 55, then transferred by the lifter 56 to the receiving station $P_5$ on the turntable 49 and is set to the strain apparatus again.

At an unloading station $P_6$ to which the turntable 49 is rotated 90 degrees, pressurized fluid is introduced into the chamber 24a of the aforementioned cylinder 24 so that left and right press heads 22 and 23 and the base plates 6 are pulled to each other, thus compressing the springs 3 to disengage the shoe receiving members 8 and the shoe positioning members 9 from the end portions 12a and 12b of the brake shoes 11.

The magnetic chuck of the unloader 58 descends to attract the brake shoes 11, removing them from the bonding apparatus 1, to the conveyor 57. The brake shoes are processed through an engraver and a lining grinder further to be finished as final products.

As thus far described, the operating steps to follow in bonding work involve manual work only when inserting the brake shoes 11 and the linings 19 into the bonding apparatus 1 prior to bonding. The remaining operating steps can be automated. A variety of modifications of the embodiment are possible for the aforementioned lay out.

The brake lining bonding apparatus according to the present invention is arranged so that the expanding member 2 does not pinch the rib 12 of the brake shoe 11, but abuts the end portions 12a and 12b of the rib 12. The pressure imposing band 4 is provided with the rigid strips 16 for registry at two locations circumferentially so that the pressure imposing band 4 is formed in the shape of substantial ellipse.

Thus when the springs 3 are compressed, insertion and removal of the brake shoes 11 and linings 19 can easily be performed between the expanding member 2 and the pressure imposing band 4 which surrounds the expanding member 2 and is properly maintained in an ellipse by rigid strips 16.

In other words, when bonding is over, the end portions 12a and 12b of the brake shoes 11 disengage from the left and right ends of the expanding member 2 by compressing the springs 3, thus the brake shoes can easily be unloaded from the pressure imposing band 4 and the expanding member 2 by lifting up the brake shoes 11. Prior to bonding, the brake shoes 11 and the linings 19 can easily be inserted into the space between the expanding member 2 and the pressure imposing band 4, and bonding is carried out by releasing the springs 3.

In this manner, insertion of the brake shoes 11 before bonding and removal of the brake shoes 11 after bonding can be performed in a simple, single procedure in which the brake shoes 11 and the linings 19 are moved laterally with respect to the pressure imposing band 4, thereby readily permitting automated bonding work.

Further, with a bonding apparatus according to the present invention as mentioned above, the bonding apparatus 1 is supported by the skates 10 provided on the left and right base plates, permitting smooth insertion and removal of the brake shoes 11 and the linings 19 prior to and after bonding as well as transferring them to a finishing process subsequent to the heating and bonding processes. Thus the present bonding apparatus is applicable to automation lines.

Further, the brake shoe positioning apparatus is arranged so that one circumferential end 12a of the rib 12 of a brake shoe 11 is allowed to abut a shoe receiving member 8 of the base plates 6, and a shoe positioning member 9 is provided with a cut-out 9a of a shape into which the other end 12b of the rib 12 fits, thus preventing circumferential misalignment of the brake shoes 11 with the aid of the above-mentioned shoe receiving member 8 and shoe positioning member 9.

Consequently, simple loading of the brake shoes 11 into the bonding apparatus 1 allows proper positioning of the brake shoes in the bonding apparatus 1 without any adjustment. The brake shoes 11 are constructed so that the circumferential ends 12a and 12b of the ribs 12 abut the shoe receiving members 8 and the shoe positioning members 9, thus allowing a simple and single procedure which requires only lateral movement with respect to the pressure imposing band 4 when inserting the brake shoes and the linings 19 into the apparatus and unloading them after bonding. This is effective to automate the bonding operation.

The disclosed invention, in which the shoe receiving members 8 and the shoe positioning members 9 are removably mounted to the base plate 6, can be adapted to accommodate a variety of sizes of brake shoes 11 by replacing the shoe receiving members 8 and the shoe positioning members 9 for appropriate sized ones, thus being economical.

Further, a lining positioning apparatus according to the present invention as mentioned above is arranged so the circumferential positioning of the linings 19 is carried out by the lining positioning members 35 and 36 mounted on the front and rear mounting seats 37 and 38. The mounting seats 37 and 38 are arranged in such a way that the mounting seats approach the bonding apparatus 1 within a predetermined distance and the ends 35a and 36a of the lining positioning member abut the circumferential ends 19a and 19b of the lining 19 through the elongated holes 17 and 18 of the belt strips 15 of the pressure imposing band 4. Thus, when the mounting seats 37 and 38 approach the bonding apparatus 1, the ends 35a and 36a of the lining positioning member abut circumferential ends 19a and 19b of the linking 19 through the elongated holes 17 and 18 of the belt strips 15 of the pressure imposing band 4, thereby preventing circumferential misalignment of the linings 19. Loading the linings 19 into the bonding apparatus 1 allows proper positioning in the bonding apparatus without any adjustment. The bonding work can be made easy and also suitable to an automated bonding operation.

What is claimed is:

1. A brake lining bonding apparatus in which brake linings are positioned between a loop-like pressure imposing band and a pair of brake shoes, said brake shoes being disposed at opposite locations on an inner side of said band, and said brake linings being pressure bonded to said brake shoes by expanding in opposite directions an expanding member, wherein said expanding member comprises:

left and right base plates which are central members that receive an expanding force;

shoe receiving members provided on one end of each of said base plates, said shoe receiving members being arranged to abut against one circumferential end of a rib of each of said brake shoes;

shoe positioning members provided on the other end of each one of said base plates, said shoe positioning members being shaped to fit to the other circumferential end of said rib of each of said brake shoes along a circumferential direction of said pressurizing band; and wherein said pressure imposing band is provided with rigid strips at two circumferential locations for providing a substantially elliptical shape and for positioning itself at a predetermined position.

2. A brake lining bonding apparatus of claim 1, wherein said pressure imposing band comprises two belt strips having equal length, wherein both ends of said belt strips are attached to said rigid strips, so that said substantially elliptic shape is maintained.

3. A brake lining bonding apparatus of claim 2, wherein said belt strips are made of spring steel and said rigid strips are made of steel.

4. A brake lining bonding apparatus of claim 2, wherein said belt strips are provided with elongated holes proximate to said rigid strips.

5. A brake lining bonding apparatus of claim 1, wherein each one of said base plates is provided with pin insertion holes, and said brake lining bonding apparatus is carried by a hook having pins which are adapted to be inserted into said pin insertion holes.

6. A brake lining bonding apparatus of claim 1, wherein said lining bonding apparatus is positioned by bonding-apparatus positioning means on a table via said base plates.

7. A brake lining bonding apparatus of claim 1, further comprising springs for providing said expanding force, wherein said springs are compressible by a compressing means.

8. A brake lining bonding apparatus of claim 7, wherein said compressing means comprises a pair of press heads which hold said expanding member in a sandwich relation.

9. A brake lining bonding apparatus of claim 7, wherein said compressing means is actuated by a rack-and-pinion mechanism.

10. A brake lining bonding apapratus of claim 7, wherein said expanding member is provided with a safety pin to prevent said expanding member from being expanded by said springs in excess of a predetermined value.

11. A brake lining bonding apparatus in which brake linings are positioned between a loop-like pressure imposing band and a pair of brake shoes, said brake shoes being disposed at opposite locations on an inner side of said band, and said brake linings being pressure bonded to said brake shoes by expanding in opposite directions an expanding member, wherein said expanding member comprises:

left and right base plates which are central members that receive an elastic force;

springs for providing said elastic force;

shoe receiving members provided on one end of each one of said base plates, said shoe receiving members being arranged to abut against one circumferential end of a rib of each of said brake shoes;

shoe positioning members provided on the other end of each one of said base plates, said shoe positioning members being shaped to fit to the other circumferential end of said rib of each of said brake shoes along a circumferential direction of said pressurizing band; and skates, said skates being provided on said base plates to support the bonding apparatus at a predetermined height.

12. A brake lining bonding apparatus of claim 11, wherein said skates are secured under said respective base plates, and are disposed in paired arrangement with a space therebetween.

13. A brake lining bonding apparatus of claim 11, wherein said lining bonding apparatus can slide on a conveyor by means of said skates.

14. A brake lining bonding apparatus in which brake linings are positioned between a loop-like pressurizing band and a pair of brake shoes, said brake shoes being disposed at opposite locations on an inner side of said band, and said brake linings being pressure bonded to said brake shoes by expanding in opposite directions an expanding member which is urged by springs, wherein said expanding member comprises:

left and right base plates which are central members that receive an elastic force of said springs;

shoe receiving members provided at one end of each one of said base plates;

shoe positioning members provided at another end of each one of said base plates, so that said shoe receiving members abut against one circumferential end of a rib of each of said brake shoes; and said shoe positioning members are shaped to fit to the other circumferential end of said rib of each of said brake shoes along a circumferential direction of said pressurizing band.

15. A brake lining bonding apparatus of claim 14, wherein said shoe receiving members and said shoe positioning members are detachably supported by said base plates.

16. A brake lining bonding apparatus of claim 14, wherein said shoe positioning members are provided with a cut-out in a shape corresponding to said other circumferential end of said rib of each of said brake shoes.

17. A brake lining bonding apparatus in which brake linings are positioned between a pressure imposing band and a pair of brake shoes, said brake shoes being disposed at opposite locations on an inner side of said band, and said brake linings being pressure bonded to said brake shoes by expanding in opposite directions an expanding member which is urged by springs, wherein said apparatus is provided with a lining positioning mechanism, said lining positioning mechanism comprising:

front and rear mounting seats which position said brake linings; and lining positioning members mounted on said mounting seats, wherein said lining positioning members are arranged to abut against circumferential ends of said brake linings through elongated holes formed in said pressure imposing band.

18. A brake lining bonding apparatus of claim 17, wherein said lining positioning members are detachably supported on said mounting seats.

19. A brake lining bonding apparatus of claim 17, wherein said mounting seats are provided with fitting portions to receive said lining positioning members.

20. A brake lining bonding apparatus of claim 17, wherein said lining positioning members are provided with end portions and indicators for indicating the location of said end portions of said lining positioning members.

21. A brake lining bonding apparatus of claim 20, wherein said indicators are of the same shape as said end portions of said lining positioning members.

* * * * *

UNITED STATES PATENT AND TRADEMARK OFFICE
CERTIFICATE OF CORRECTION

PATENT NO.   : 5,053,102
DATED        : October 1, 1991
INVENTOR(S)  : Yukio Iwata It is certified that error appears in the above-indentified patent and that said Letters Patent is hereby corrected as shown below:

On the Title Page, Item [57], line 1, before "bonding" insert --lining--.

Claim 21, column 14, line 4, after "of" insert --substantially--.

Signed and Sealed this

Twenty-first Day of June, 1994

Attest:

BRUCE LEHMAN

*Attesting Officer*          *Commissioner of Patents and Trademarks*